United States Patent [19]

Scherer et al.

[11] 4,019,653
[45] Apr. 26, 1977

[54] AUTOMATIC PROPORTIONING PAINT SPRAY SYSTEM

[75] Inventors: William C. Scherer, Minneapolis, Minn.; Raymond A. Vincent, Detroit, Mich.

[73] Assignee: Graco Inc., Minneapolis, Minn.

[22] Filed: Aug. 22, 1975

[21] Appl. No.: 606,926

[52] U.S. Cl. .................................... 222/1; 222/25; 222/52; 222/70; 222/144.5; 239/61; 239/71
[51] Int. Cl.² ...................... B05B 7/04; B67D 5/28
[58] Field of Search ............ 222/1, 14, 23, 36, 37, 222/32, 33, 52, 70, 71, 76, 135, 14 S, 25, 144.5; 239/61, 62, 71

[56] References Cited

UNITED STATES PATENTS

| | | | |
|---|---|---|---|
| 3,229,077 | 1/1966 | Gross | 222/26 UX |
| 3,429,480 | 2/1969 | Petyt | 222/26 |
| 3,651,989 | 3/1972 | Westrich | 222/14 |
| 3,777,935 | 12/1973 | Storey | 222/26 X |
| 3,921,901 | 11/1975 | Woodman | 239/61 X |

Primary Examiner—Robert B. Reeves
Assistant Examiner—David A. Scherbel
Attorney, Agent, or Firm—Paul L. Sjoquist

[57] ABSTRACT

Apparatus is disclosed for spraying paints wherein the paint comprises a predetermined ratio mixture of at least two components, and wherein the ratio of these components is controlled automatically as they are delivered to a spray gun and prior to mixing, by means of flow-sensing devices which generate flow-representative signals to a control unit. The control unit calculates the appropriate ratio and adjusts a flow regulating device in at least one of the component lines for ensuring continued flow at the desired ratio.

25 Claims, 6 Drawing Figures

AUTOMATIC PROPORTIONING PAINT SPRAY SYSTEM

BACKGROUND OF THE INVENTION

This invention relates to the spraying of paint, preferably to an automatic system for spraying articles on a moving conveyor line wherein periodic or random changes of color are necessary. More specifically, the invention relates to a paint spraying apparatus for proportioning and mixing two paint components together for delivery to a spray gun.

One of the developments of modern paint technology is a liquid urethane paint having a color component and a catalyst component, each of which are relatively stable when isolated but which become highly reactive when mixed together. One of the consequences of the highly reactive mixture is that the pot life of the mixture becomes very short, and the paint mixture begins curing in a relatively few minutes. Because of this reactive characteristic the paint components must be mixed as close to the point of application as possible, and must not be allowed to remain in a paint line or spray apparatus for more than a few minutes without purging with a solvent for cleaning out the residue. This requires that special paint handling, mixing, and solvent purging equipment be developed especially for use with this type of paint.

A further characteristic of highly reactive urethane two-component paints is that the ratio of the colorant component and the catalyst component requires very strict regulation for proper and consistent color control on the finished product. Ratio tolerances having accuracies to ±2% are desired in order to maintain uniform color consistency, for variations in ratio will cause the paint curing process to vary on the finished product. Furthermore, the absolute value of the ratio of colorant to catalyst may vary from one color mixture to another, requiring that a new ratio setting be made for different color selections, and once made, that this ratio be held to close tolerance levels.

While it is possible in the simplest case to control the ratio of two fluids by merely adjusting a valve setting in the respective fluid lines, this is not an adequate solution when the fluids being controlled are subjected to flow variant effects such as changes in viscosity, pressure and temperature, as well as changes in the flow restricting characteristics of apparatus downstream from the valve. For example, the flow rate in a paint spray system may be at least crudely controlled by inserting a valve in the paint line. However, variations in upstream paint pressure will affect flow rate in the line as will variations in temperature and batch characteristics of the paint. A gradual buildup or deposit of residue in the paint lines may change the flow rate. The paint spray gun itself affects flow rate, in that temporary obstructions in the paint spray orifice may impede flow, and gradual wear of the orifice may increase flow over time. All of the aforementioned variables must be either compensated for or controlled in an automatic paint spray system which utilizes two-component urethane paint.

SUMMARY OF THE INVENTION

The present invention comprises a first paint component control loop and a second paint component monitor circuit, wherein one paint component may be a colorant component received from any of a plurality of different colorant lines which are either manually selected or are coupled into a color selection apparatus of the type generally known in the prior art. The color selection apparatus has a single output flow line for the selected color, which line is connected to a flow sensor for monitoring flow rates through the line. The sensor generates a signal representation of flow rate and transmits it to a control unit. The other paint component control loop, which may control a paint catalyst component, comprises a controllable valve and a second flow sensor, both of which are coupled to the control unit. The control unit receives a preset signal representative of the desired flow ratio, monitors the flow rate signals from the respective lines, calculates the actual ratio for the selected color, compares it with the desired ratio, and adjusts the controllable valve in the catalyst line to affect catalyst flow rate and thereby achieve the desired ratio. The catalyst and color component lines are coupled to a spraying apparatus through a suitable mixing chamber. The apparatus has feed lines to an air supply and a solvent supply through appropriate valves which enable the operator to provide atomizing air for the paint spraying operation and to provide a solvent purge cycle between color selection changes. The operation of the entire apparatus may be synchronized with a moving conveyor line carrying articles to be painted, so that the entire paint selection, ratio control, mixing, spraying, and purging cycle can be coordinated to the position of articles moving along the conveyor.

BRIEF DESCRIPTION OF THE DRAWINGS

A preferred embodiment of the invention is described herein and with reference to the drawings, in which.

DESCRIPTION OF THE PREFERRED EMBODIMENT

Figure 1:
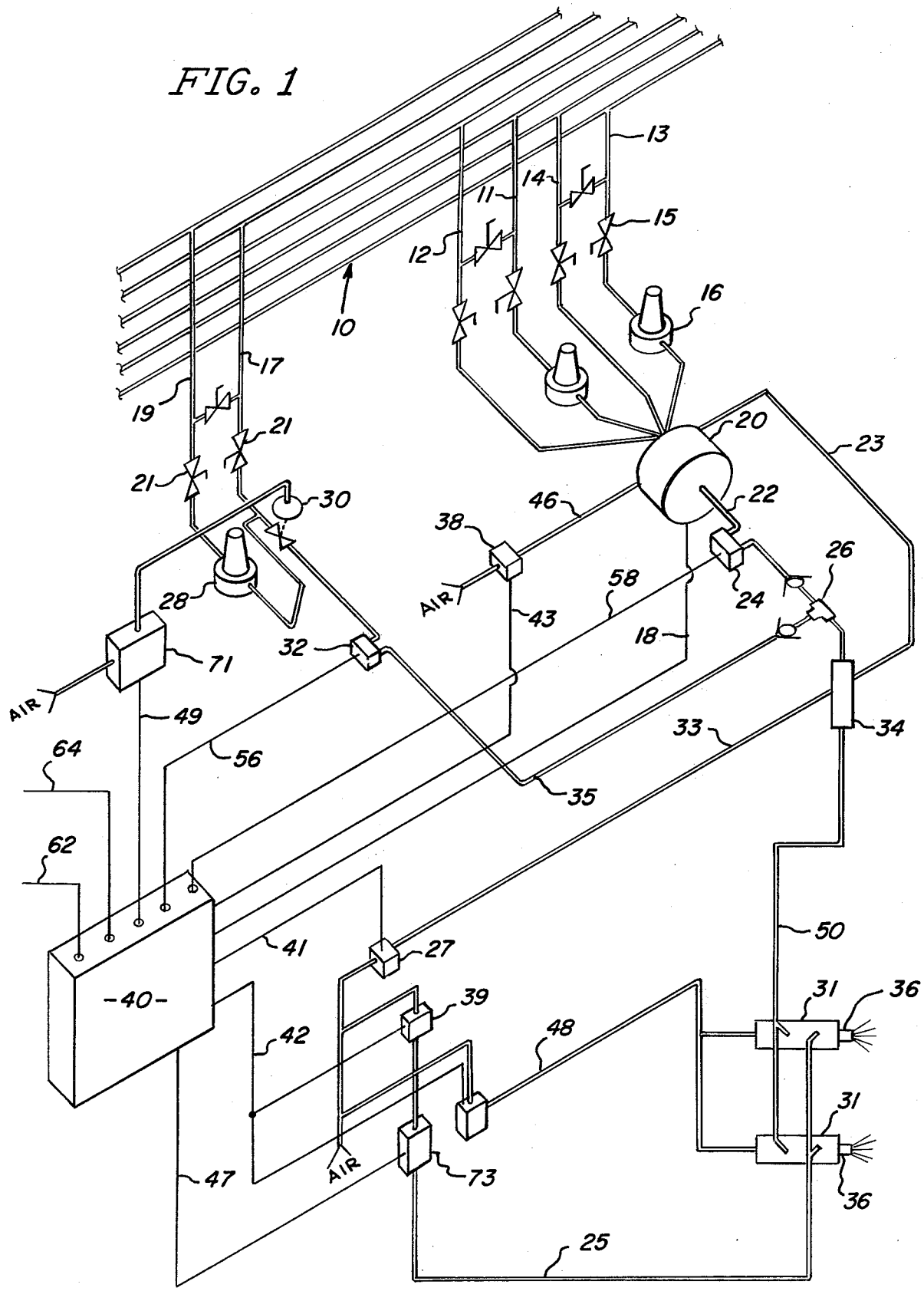
FIG. 1 illustrates the invention in diagramatic and pictorial view in an automatic painting system.

Referring first to FIG. 1, the invention is shown in diagramatic and pictorial view in an automatic color selection and spraying system. A plurality of paint supply and return lines 10 deliver paint from a suitable storage location. Lines 10 may include paint return lines to enable the paint to be continuously circulated through the system to avoid sediment and caking inside the lines. It is assumed that suitable low pressure pumps are available at the supply source for creating a sufficient pressure head to circulate paint through the lines. In a typical installation a first pair of lines constitute the catalyst supply and return lines and a second pair of lines constitute a solvent supply and return lines. Additional pairs of lines are utilized for supply and return of the various color components; typically there may be up to 31 pairs of such lines to carry color components for 31 different paint colors. Finally, air lines are usually provided for delivering compressed air at pressures ranging from 20–100 pounds per square inch (p.s.i.). It the apparatus is used in conjunction with a conveyor system, lines 10 are mounted adjacent the conveyor line and suitable taps are provided for connecting one or more systems of the type described hereinafter. FIG. 1 illustrates one such tapped system connection for a simplified example comprising two paint colorant connections. Line 11 is connected to tap into the supply and return lines 10 and to deliver a particular paint colorant component to the system, and line 12 comprises a return line to return the same colorant component to the supply and return lines 10. Similarly, line 13 delivers a second colorant component and line 14 returns that component to supply lines 10. Each of the aforementioned lines is connected to a manual valve such as valve 15 for line 13. Valve 15 may be a simple, conventional shutoff valve for providing a means for manually connecting and disconnecting the line into the system.

Color component delivery line 13 is connected to a regulator 16. Similar regulators are connected to each of the other colorant delivery lines. Regulator 16 may be selected from any of a number of commercially available fluid regulators, such as for example, fluid pressure regulator, Model 203-831, manufactured by the assignee of the present invention.

All of the colorant delivery lines and return lines are coupled into a color changer mechanism 20 which may be a commercially available unit, such as the assignee's Model 208-224. Color changer 20 is actuable by other apparatus (not shown), outside the scope of the present invention, to select and couple one of the plurality of color lines to an output line 22 so as to delivery only the single selected paint colorant through line 22. Line 22 passes through flow sensor 24 to be hereinafter described and then to spray gun manifold 26. All of the fluid connecting lines described herein may be pipe or flexible hose designed for transporting paints and other fluids under low pressure.

The paint catalyst component is similarly delivered to the present invention. A catalyst delivery line 17 is tapped into supply and return lines 10 and a catalyst return line 19 may recirculate the catalyst to supply lines 10. A pair of commercially available valves 21 control the delivery and return lines. These lines are then connected into a back pressure regulator 28, which may be of commercial construction such as Model 206-019, manufactured by the assignee of the present invention. One port of regulator 28 is connected to controllable valve 30, to be hereinafter described, and then to flow sensor 32, although the relative position of these two elements may be interchanged in a particular application. Flow sensor 32 is of identical construction to flow sensor 24, and the description herein applies to either sensor. The outlet of flow sensor 32 is connected to spray gun manifold 26 via suitable hoses, to deliver the paint catalyst component to the spray gun.

The paint colorant component and the catalyst component are intermixed in spray gun manifold 26 and in a mixer 34 which connects between manifold 26 and one or more spray guns 31. Mixer 34 may be a type such as that described in U.S. Pat. No. 3,286,992, issued Nov. 22, 1966.

An air line 23 is also connected into color changer 20. Air line 23 is supplied from a compressed air source via control valve 27, which may be a solenoid actuated valve controllable by electrical signals from a control source (not shown), or it may simply be a manually actuable valve. Similarly, an atomizing air line 25 is supplied from a compressed air source via a control valve 39 which may also be a solenoid actuated valve controlled by electrical signals from a control source (not shown). The electrical signals for actuating valves 27 and 39 are delivered over wires 41 and 42 respectively.

Control unit 40 comprises a signal processing unit, which in the preferred embodiment is an analog control unit, although it equally well may be a programmable digital computer, which monitors the flow sensors of this invention. Control unit 40 generates control signals for controlling controllable valve 30. Control unit 40 may also generate signals for controlling the relative selection position of color changer 20 to select one of a plurality of color components, particularly if it is a programmable digital computer. In this regard, control unit 40 may receive an input from an external source such as an operator or automatic card reader which specifies the desired color of a particular article progressing along the conveyor system. Color selection may thus be synchronized to actuate the color changer 20 to deliver the appropriate color at the time when the article is positioned proximate spray guns 31.

For purposes of illustration spray guns 31 are shown in simplified diagrammatic view. In a particular embodiment spray guns 31 may be automatic reciprocating spray guns which are cyclical through a predetermined spray geometry, or they may be manually operable. In an alternative embodiment of the invention the spray geometry or path of travel of spray guns 31, if such is an automatic spray machine, ma itself be controllable. In these applications control unit 40 may receive an outside stimulus to enable it to select the actual travel path of the automatic spray machine, and this stimulus may be received from an operator or other apparatus as referred to hereinbefore. In any case, the operation of the apparatus controls the spraying of atomized paint through paint spray orifices 36, and may control the solvent and/or air purge cycle of the orifices 36.

Color changer 20 may be a commercially available color changer such as Model 208-224, manufactured by the assignee of the present invention. Commercial color changers are available for selecting one of up to 31 paint color components. They generally include at least one connection to a solvent line for flushing the color changer internal passage between color selections. Connections are made to each of the plurality of paint lines, as for example paint lines 11 and 13. Associated with each paint line is an air operated valve which has connected to it an air line which may be selectively pressurized to open the air valve and allow the respective paint colorant component to flow into output line 22. Each of the air lines is controlled by means of a solenoid operated valve, such as valve 38 for controlling air line 46. These solenoid valves are commercially available. For example, valve Model Q53DB2150, manufactured by Skinner Precision Industries Inc., would be suitable for this purpose.

Figure 2:
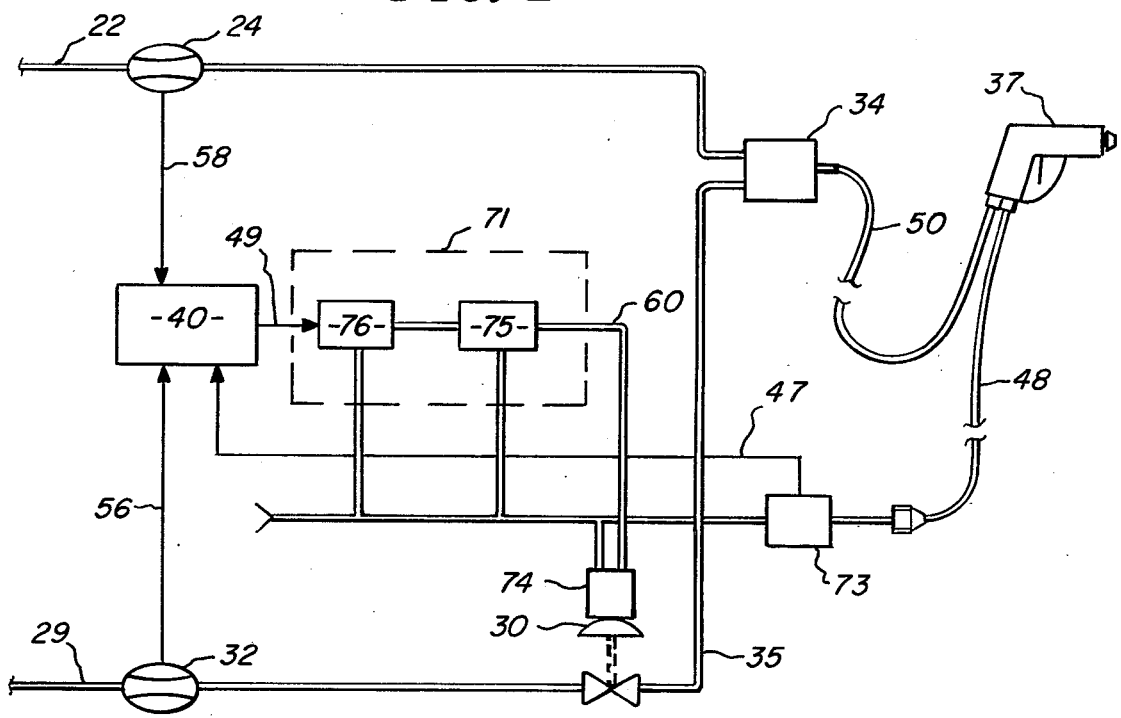
FIG. 2 illustrates a block diagram of the apparatus.

FIG. 2 illustrates a block diagram of the apparatus of this invention. Paint line 22 connects to sensor 24, which in turn is connected to mixer 34. For purposes of simplification, manifold 26 (see FIG. 1) is not shown on FIG. 2. Paint lines 29 connects into the series combination of flow sensor 32 and controllable valve 30. In FIG. 2, these elements are shown reversed from their respective positions in FIG. 1, and this may be a preferred connection in some applications. In either event, the output paint line 35 is coupled into mixer 34, and the two paint components are mixed therein. A paint hose 50 conveys the mixed components to a spray gun 37, which in FIG. 2 is diagramatically illustrated as a manually operated spray gun. An air hose 48 is also connected to spray gun 37 for purposes of providing air to the spray gun when its trigger is actuated. A solvent hose (not shown) may also be provided to a spray gun 37 and/or to mixer 34 for purposes of flushing the internal mixed paint delivery system for cleaning.

A signal on line 58 representative of flow rate through sensor 24 is connected to control unit 40. Similarly, a signal on line 56 representative of flow rate through sensor 32 is connected to control unit 40. Control unit 40, in a manner to be hereinafter described, scales the one flow signal by a preset value and compares it with the other flow signal to generate a position signal for positioning controllable valve 30. This position signal is transmitted via line 49 to a conveyor 71, which converts the electrical signal on line 49 to an air pressure signal transmitted out on line 60. Converter 71 also receives a supply of pressurized air from a suitable compressed air source. Converter 71 is comprised of an electropneumatic transducer 76 and a volume booster 75, both of which are commercially available components available from Fairchild Industrial Products, Winston Salem, N.C. Electropneumatic transducer 76 is an electrical/air pressure transducer which receives an input electrical signal of variable DC level, ranging between 4 and 20 milliamps (ma.). It generates an output signal in the range of 3–15 psi at approximately 0.1 cubic feet per minute air volume. A model which is suitable for use with the present invention is Fairchild Model T5100-4.

Volume booster 75 is a commercially available unit from Fairchild Industrial Products, Model 2012. This unit receives an input air signal ranging from 3–15 psi at approximately 0.1 cubic feet per minute, and generates an output air signal of 3–15 psi at 20–40 cubic feet per minute. Volume booster 75 is needed to transform an input pressure signal at a relatively low air flow volume to an output air pressure signal at an air flow volume sufficient to drive controllable valve 30. Converter 71, comprising electropneumatic transducer 76 and volume booster 75, has a response speed sufficiently fast (300–400 ms.) to rapidly actuate controllable valve 30 in response to position signals received on line 49.

Control valve 30 is a commercially available valve, available from Precision Products and Controls Inc., Tulsa, Oklahoma, under model designation "¼-inch MINIM flow valve." It receives an input air pressure signal, which acts against a diaphragm having a preloaded spring, to open a needle valve in the flow path a predetermined amount. It is available in models having several different valve-opening dynamic characteristics, called valve "trim." The trim selection which has been found to be most useful for the present invention is known as "quick opening" trim.

Overall system response speed may be further enhanced by the addition of a control valve positioner 74, which may be attached to control valve 30. Control valve positioner 74 functions to provide an enhanced pressure drive signal to ensure that control valve 30 nulls at its preselected position accurately and quickly. It receives a 3–15 psi input air pressure signal at approximately 20 cubic feet per minute and generates a higher level outpt pressure signal to force control valve 30 to a position representative of the input signal. Control valve positioner 74 is a commercially available device available from Moore Products Company, Spring House, Pa., under model designation 73NB.

A compressed air line from a suitable compressed air source feeds the air-operated devices hereinbefore described, and also provides a source of air for spray gun 37. Pressurized air to spray gun 37 is fed via an air hose 48 and a start up control 73 to be hereinafter described. Start up control 73 generates an electric actuating signal on line 47 a predetermined time after air flow begins through air hose 48. This signal is fed back to control unit 40 to control the flow regulating apparatus during the initial start up period when transient flow conditions exist in the respective paint lines. The advantage of this control feature will be described hereinafter.

Figure 3:
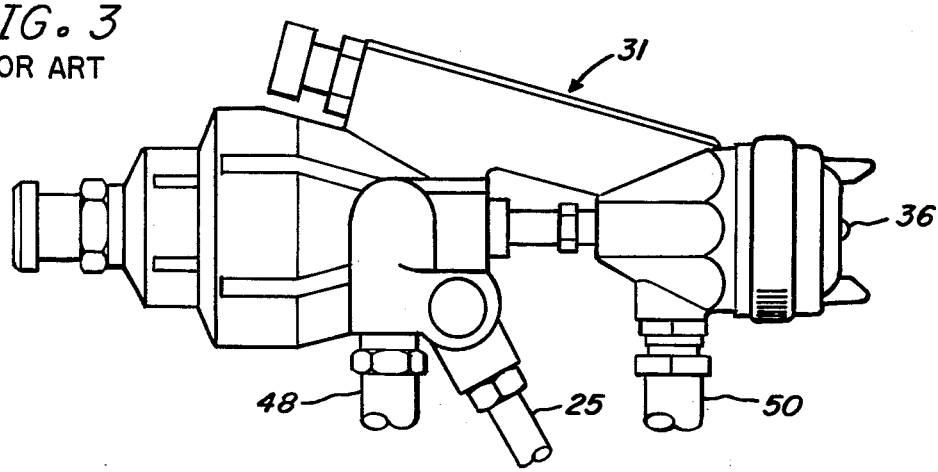
FIG. 3 illustrates a spray gun usable with the present invention.

FIG. 3 illustrates a typical automatic paint spray gun which may be used with the invention. Such paint spray guns may be either automatic or manually operated, and in the preferred embodiment are automatic air spray guns such as Model 208-604, manufactured by the assigee of the present invention. Spray gun 31 has an inlet for connecting to the paint spray line 50, an inlet for connecting to an atomizing air line 25, and an inlet for connecting to a trigger actuating air line 48. The spray gun is actuated by means of introducing compressed air via air line 48 to cause an internal piston to retract, thereby unseating a needle valve from orifice 36. This permits the mixed paint components from paint spray line 50 to be ejected through orifice 36. Atomizing air line 25 introduces compressed air which is mixed with the paint components to assist in the atomizing of the paint and thereby improve the quality of the spray pattern. The actuation of valves for controlling atomizing air line 25, air line 48, and paint spray line 50 may be under the control of an external controller (not shown) which generates signals to activate suitable solenoid valves connected into these respective lines.

Figure 4:
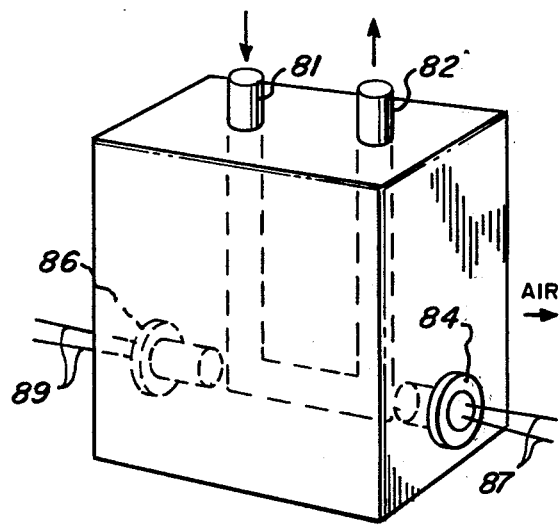
FIG. 4 illustrates a schematic diagram of the sensor.

FIG. 4 illustrates a schematic block diagram of a flow-sensor which may be used with the present invention. Flow-sensor 24, which monitors the flow rate of paint colorant component through line 22, and flow-sensor 32, which monitors the flow rate of catalyst, are identical devices, illustrated in FIG. 4. These devices are passive electronic flow-sensors, deriving their measurement signals from electrical signals which are affected by the flow of the liquid passing through them, rather than by any mechanical means which might come in direct contact with the liquid. Other mechanical devices, such as turbine flow meters, etc. might also be utilized with the present invention, but the preferred embodiment utilizes passive electronic flow-sensors.

A body 80 has an inlet 81 and an outlet 82, and an internal U-shaped passage communicating between the inlet and outlet. Body 80 may be made from lucite or other plastic material, or from a metal such as aluminum. A first acoustic transducer 84 is imbedded into body 80 adjacent one leg of the U-shaped passage and in axial alignment with the base portion of the U-shaped passage. A second acoustic transducer 86 is similarly axially aligned adjacent the opposite end of the base portion of the U-shaped passage. A pair of signal wires 87 and a second wire pair 89 are respectively connected to the transducers for energizing and for receiving signals transmitted by the other transducer.

A paint component, either colorant or catalyst is fed through the passages of body 80, and the transducers are selectively energized to provide signals to be utilized as a measure of flow rate of the paint component through the passages. For example, a signal pulse is introduced through the wires 87 to transducer 84, and the transducer responds by generating an acoustic pulse which travels the length of the axially aligned base passage. The time required for the travel of this acoustic pulse is affected by the directional flow of fluid through the passage. When the acoustic pulse is received by transducer 86 it causes transducer 86 to generate an electrical signal pulse, of diminished amplitude, over its wire pair 89. Next, the same sequence is followed but with transducer 86 as the sending unit and transducer 84 as the receiver, and the time required for this second acoustic pulse to travel between the transducers is affected by the directional flow of fluid through the passage. But for the directional fluid flow through the passage, the time of travel of each of the aforementioned acoustic pulses would be equal, and the extent of this time differential is therefore a measure of fluid flow rate through the passage. This time differential is converted into a time or frequency domain electrical signal, by circuits within the respective flow sensors, which is representative of the fluid flow rate through the sensor. A further example of circuits which may be capable of providing a flow rate-representative signal may be found with reference to U.S. Pat. Nos. 3,420,102 and 3,653,259 which are incorporated herein by reference. Other similar circuits may be adapted by those skilled in the art to provide DC voltage levels or current levels ranging from 4-20 milliamps (ma.) which is the preferable current range for the sensor output signal for use with the embodiment described herein. This current range is sufficient to activate the control unit 40 circuits to be hereinafter described.

Figure 5:
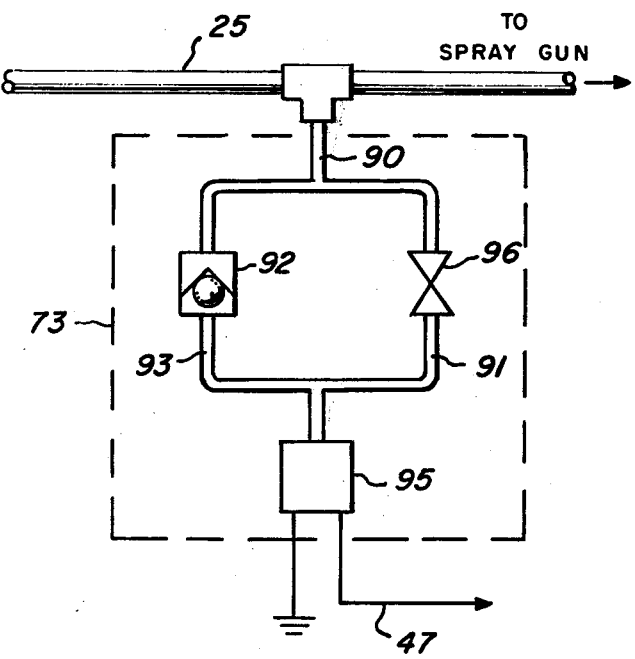
FIG. 5 illustrates a schematic diagram of the startup control.

FIG. 5 illustrates a schematic diagram of the startup control which is used in the present invention. Startup control 73 is connected into atomizing air line 25, or signal air line 48 as shown in FIG. 2, to detect the presence or absence of air flow through the line. When the spray gun is not being actuated no atomizing air flows through the line and a back pressure develops in the line which is coupled into startup up control 73 by means of an air line 90. Air pressure in line 90 causes check valve 92 to become unseated and enables the air pressure head to develop in lines 91 and 93, and to be coupled to a pressure transducer 95. Pressure transducer 95 may be any of a well known number of prior art and commercially available pressure transducers having a normally open electrical switch contact therein, so that under conditions of pressurized input the circuit ground applied to one switch contact is open-circuited to prevent a circuit ground potential from being transferred to line 47. Under conditions of reduced pressure, transducer 95 causes electrical contact to be made between the terminals and thereby transfers the circuit ground to line 47. Thus, under conditions when the spray gun is not being actuated, transducer 95 prevents the circuit ground from appearing on line 47, and all internal air lines within startup control 73 are pressurized. As soon as the spray gun is actuated a sudden pressure drop occurs in atomizing air line 25. This pressure drop cannot be passed through one way check valve 92, nor may it be immediately passed through adjustable needle valve 96. Needle valve 96 is preadjusted to leak air at a predetermined rate, so that the pressure drop in line 25 is not immediately sensed by pressure transducer 95. However, after the predetermined time interval as set by needle valve 96, the pressure drop in line 91 becomes low enough to be sensed by pressure transducer 95 and the electrical circuit contacts are made to transfer the circuit ground to line 47. This voltage is coupled back to control unit 40 for purposes which will be herinafter described. It is sufficient to note that line 47 is an open line while the spray guns are inactive, and remains open for a predetermined time after the spray guns become activated whereupon it becomes grounded.

Figure 6:
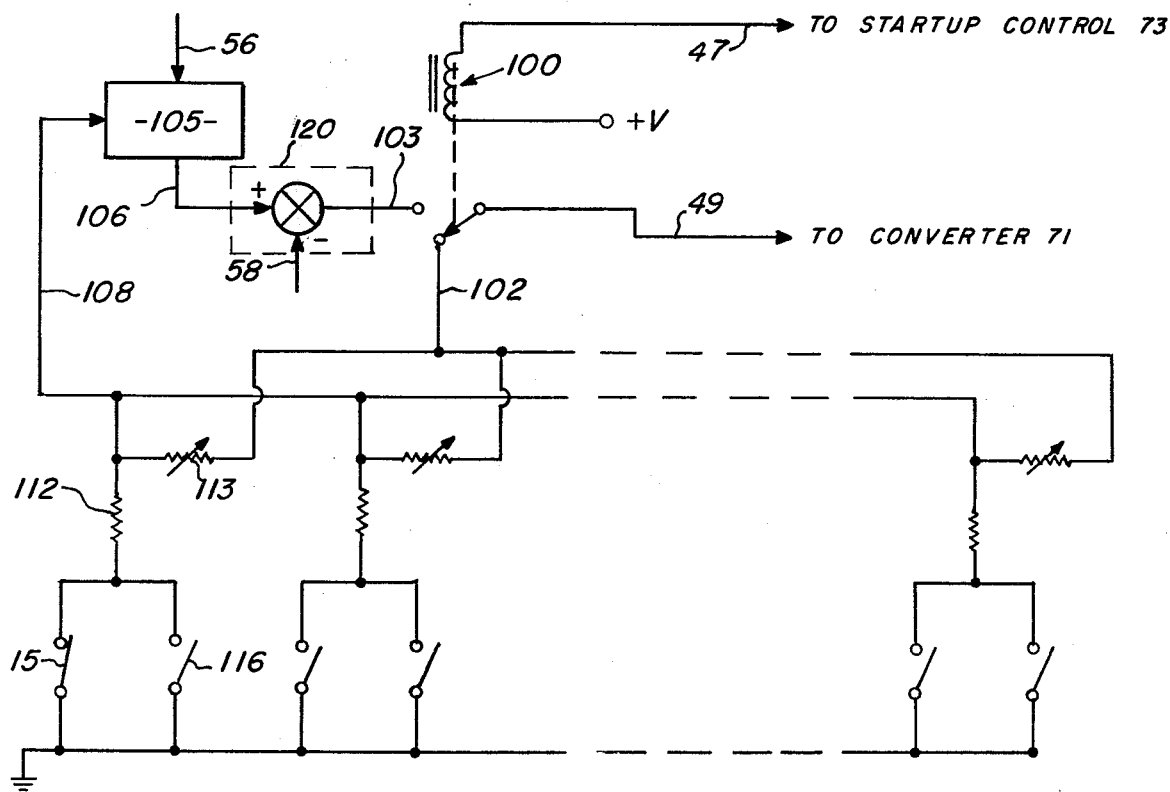
FIG. 6 illustrates a schematic diagram of the control unit.

FIG. 6 illustrates a schematic diagram of the control unit of the present invention. Line 47, from the start up control 73 hereinbefore described, is connected to a relay 100 within control unit 40. Relay 100 controls the selective switching of line 49 to converter 71. Signal line 102 connects to a plurality of color selection circuits, and more specifically to a plurality of variable resistances which form a part of the color selection circuits. The operation of each of these color selection circuits is similar, although their respective adjustments permits predeterined and different voltage level outputs from the respective circuits. For example, signal line 102 is connected to variable resister 113, which is in turn connected to resistor 112. Resistor 113 enables the signal to line 49 to be selectively adjusted, and thereby enables the converter 71 input signal to be selectively controlled. Resister 113 is associated with one of the plurality of color components which may be selected for spraying in the system, and its variable adjustment is set to provide a voltage on line 102 which represents the preferred initial position signal associated with the particular color component and it initially controls the position of control valve 30. If the paint colorant component associated wth resistor 112 is selected, one of the two switches 115 and 116 will be closed, as for example switch 115 in FIG. 6. This completes an electrical circuit through resistor 112 to multiplier circuit 105. This circuit provides a signal on line 108, dependent upon the value selected for resistor 112, to multiplier circuit 105 which is representative of the desired ratio setting for the selected paint component. It also provides an input voltage signal via resistor 113 and signal line 102 to initially position control valve 30.

At some point after the desired colorant component has been selected, the spray gun will become actuated for spraying. A predetermined time after this occurs, line 47 becomes grounded and relay 100 energizes, connecting line 49 to error signal line 103. At this point the position of control valve 30, via converter 71, comes under the control of ratio controller 120, which modulates its output 103 signal to drive control valve 30 in a direction which nulls the differential error signal at line 103, which signal is the difference between the colorant flow rate signal on line 58 and the output of multiplier circuit 105 on line 106. As previously stated, multiplier circuit 105 forms the product of its two input signals, i.e., the desired flow ratio on line 108 and the actual catalyst component flow signal on line 56. The product of these signals, which appears on line 106, will be equal to the colorant flow rate signal on line 58 when control valve 30 is properly adjusted for the fluid flow ratio selected for the particular color component. If the actual fluid flow ratio deviates from the selected ratio, the signal on line 106 will become unequal to the signal on line 58 and an error signal will be coupled into ratio controller 120. This error signal will cause ratio controller 120 to change its output drive signal on line 103 and will thereby cause the position of control valve 30 to be changed.

Each of the color selection circuits shown on FIG. 6 has two activating switches illustrated. For example, activating switch 115 is closed for the color selection circuit associated with resistor 112, while activating switch 116 is shown open. Switch 115 is representative of a manual selection switch and may be located in a control panel attached to control unit 40. Switch 116 is representative of an automatic colorant selection switch, and may be activated remotely by means of a signal from some external source. Switch 116, and other switches similarly positioned, could be a remotely located semi-conductor switch or solenoid-actuated switch. All of the color selection switches shown on FIG. 6 preferably have a mechanical or electrical interlock associated with them, so that no more than one switch may be activated at any one time. This assures that only a single color selection and ratio determining resistor, i.e., resistor 112, and position resistor, i.e., resistor 113, can be energized at one time.

A commercially-available controller which can form the basic structure from which most of the functions illustrated in FIG. 6 can be developed is manufactured by Leeds & Northrup, North Wales, Pa., under the trade name "Electromax III" (Model No. 6432).

An alternative embodiment which could be selected includes a properly programmed electronic digital computer. In this alternative embodiment the central core element of control unit 40 is a programmable digital computer which has a stored internal program for effecting the activation of events described herein, and for monitoring the respective inputs necessary for control of the system. The programmable digital computer may be commercially available device. This device has an internal memory for storing data and instructions, and has suitable input and output registers for transmitting the necessary control information and for receiving the necessary monitoring information to operate the system. The computer program may be developed by one skilled in the art from the sequential operational steps which will be hereinafter described. Similarly, the internal electronic operation of the computer is readily understood by one skilled in the art of computers, and need not be further described herein. The necessary computer input and output signal lines which enable system operation to proceed as described herein are discussed below. It is to be understood that suitable signal transformation devices such as relays and other similar devices may be utilized at the interface level between the computer internal logic and the respective control and monitor devices. Thus, a computer logic signal of low voltage and power level may be amplified by circuits known in the art to a level suitable for actuating relay contacts. The relay contacts may in turn be utilized to generate the switching signals for operation of the solenoid valves and other components utilized in the system.

A digital computer enables the functional scope of control unit 40 to become expanded from that hereinbefore described, because of the flexibility afforded by computer program control and the high speed of operation of a digital computer. For example, a plurality of color selection relays may be activated by internal computer control logic signals for selecting any one of the available paint color components and feeding said component into color changer 20. Activation of these relays may be accomplished under control of the internal stored computer program, and causes a signal to be developed on one of a plurality of control lines 18 for opening a solenoid valve at color changer 20. In a typical system there may be up to thirty-one different color selection lines 18 which are independently activated by means of color selection relays.

One or more control relays may be used to develop signals over line 42. These relays enable signals to be developed to actuate solenoid valves which control the flow of atomizing air to the respective paint spray guns. A single control line 42 may be used to actuate atomizing air to one or more spray guns, depending upon the spray pattern desired. The actuation and timing of atomizing air control relays may be controlled by the internal logic and computer program within the digital computer, and proceeds according to the timing sequence hereinafter described.

One or more purge control relays may be activated under computer control to purge the paint lines between paint colorant selection changes. These relays activate line 41, which in turn controls a solenoid valve 27 for admitting air into color changer 20. These relays also activate line 43 for controlling a solenoid valve 38 for introducing solvent into color changer 20. Lines 41 and 43 may be activated either simultaneously or according to a predetermined pattern of steps. The net result of their actuation is to admit solvent and air flow through color changer 20 and thereby purge the previous colorant component from the color changer, manifold, mixer 34, paint line 50 and the spray gun. It should be noted that a suitable one-way check valve must be incorporated into each of the lines entering manifold 26 so that reverse flow through these lines is not possible. Solenoid valves may also be included in either or both paint component lines to minimize leakage during flushing.

One or more control valve relays may be selectively actuated under computer program control to develop signals over lines 49. Lines 49 may be connected to control valve 30 electronic drive circuits to transmit the desired valve position information. These signal lines ensure that control valve 30 is continually adjusted for the proper and selected flow ratio between the catalyst and colorant components. During the spraying of any selected paint color, the computer control program continually monitors flow rates and recalculates ratios, recycling its calculations every 50–500 milliseconds (ms.), thereby deriving new control valve positional information for ensuring that the ratio remains substantially constant. When a new paint color is selected, control lines 49 may generate an initial predetermined control valve setting position required for the proper initial ratio selection for that color.

Control lines 49 may also include a plurality of lines which carry signals from control valve 30 back to control unit 40. These lines may terminate in a plurality of control valve receiver relays. The return signals on lines 49 which are received by these relays are representative of the actual control valve 30 position. The digital computer may utilize this information by comparing it with the desired valve position and calculating an error signal to transmit via control valve relays to reposition the control valve to the desired position.

One or more catalyst sensor relays may be connected to input lines 56. Input lines 56 are catalyst sensor lines which contain information relating to the flow rate of catalyst through flow sensor 32. These lines provide the computer with the information necessary to make a calculation of actual flow ratio of the catalyst component.

One or more colorant sensor relays may be connected to receive signals over colorant sensor lines 58. These signals are representative of the actual flow rate of the colorant component through sensor 24, and are utilized in conjunction with the catalyst flow rate information to enable the calculation of actual fluid ratio.

A plurality of keyboard receiver relays may be provided for receiving signals over lines 62. These lines are preferably terminated in a keyboard device appropriately positioned along a conveyor line for manually inputing information. Among the types of information which may be received from this keyboard is informaion relating to the desired color of the article to be painted, information relating to the shape of the article to control spray turn-on and turn-off, and information relating to the desired ratio settings of particular color blends. In a typical operating environment the colorant blending ratio information is fed into the computer only once, and is used thereafter to calculate ratio and positional information for the various colors selected. The color selection and spray turn-on information may vary from article to article along the conveyor line. If such variation is desired, an operator must be positioned to operate the keyboard as the respective articles pass by the keyboard station into the paint spray booth, or other electronic sensing devices must be used to generate this information.

Input control line 64 may contain timing information signals which are representative of the conveyor line travel. These signals may be pulses representing increments of travel of conveyor line, measured from a given point where an article enters the spray booth, and therefore are useful to control the relative turning on and off of spray guns and purge cycles. Apparatus for developing timing signals of this type is well known in the art and exists for assembly line spraying operations.

In operation, the invention is activated through a predeterined cycle of steps which enables the apparatus to perform its required control functions. If the invention is used in conjunction with a manual paint spraying system, the operator manually selects the desired colorant component by either connecting the spray gun hose to the appropriate paint line or by a valve adjustment. The operator then actuates the spray gun trigger to cause the paint components to begin flowing through the system. It is necessary that the operator had previously flushed the paint lines leading to the spray gun with a solvent and air mixture to clean the paint line and spray gun from the previous spray operation. This being the case, the system is ready for use practically instantaneously upon actuation of the spray gun trigger. As soon as the catalyst and colorant paint components begin flowing through their respective sensors, flow rate information is transmitted to the control unit and a calculation of ratio is made to enable the controllable valve to be adjusted by the control unit. However, this calculated flow rate information is disconnected from the control valve positioning circuits for a predetermined time after the spray gun trigger has been actuated, because the initial transient flow signals may be erratic, slow and unreliable. During this initial transient time interval the preselected valve position information is coupled to drive the control valve, and this forces the control valve to a predetermied position. This predetermined valve position is selected empirically from actual system testing with each combination of catalyst and paint colorant component to provide an initial paint blend that produces satisfactory results.

After the initial transient time interval, control valve positional control is switched to the flow-sensors and interval calculations of control unit 40, which thereafter continually monitors flow and recalculates valve position information. After the spraying operation has been completed, the operator must purge the portion of the system which contained mixed catalyst and colorant in order to avoid this mixture curing inside the system, and also to remove mixed material in preparation for the next colorant spraying operation.

If the invention is used in conjunction with an automatic paint spraying system, and programmed digital computer, many of the manual functions described hereinbefore may be automatically accomplished by control unit 40. Under either the automatic or manual mode of operation the control unit must have, prior to use, information inputted into it specifying the desired ratio of the particular blend being sprayed. This information is preferably inputted into control unit 40 via a keyboard control panel or other switches. In the case of automatic system usage, the keyboard control panel may be conveniently placed near the conveyor line and may also be used for inputting color selection data. As previously mentioned, conveyor line travel may be tracked by means of signals fed into the control unit, so at any given instant the control unit has stored within it digital information describing not only the color of the article next to be painted, but also the article's relative position with respect to the automatic spray gun. At an appropriate time, when the article is properly positioned, the control unit then generates a spraying signal to actuate the automatic spray guns. The spray guns may briefly spray a preliminary shot into a waste receptacle to assure that only the proper ratio blend of catalyst and color component is moving through the paint lines as hereinbefore described. As the article moves past the automatic paint spray guns, the guns are reciprocated according to a predetermined path of travel and automatically spray the article surfaces. When the article has passed, control unit 40 returns the spray guns to their rest position and generates a purge cycle wherein a controlled volume of solvent is run through the paint spray lines and spray guns, and wherein a controlled air/solvent mixture is fed through the system. As the next article moves into painting position on the conveyor line the control unit actuates the color changer to enable it to provide the desired colorant for the next spray operation.

What is claimed is:

1. An apparatus for the controlled proportioning and mixing of two paint components during the flow of said components to a paint spray gun, comprising:
   a first flow sensor coupled to the flow path of the first paint component, said sensor having means for generating a signal representative of the rate of flow of said first paint component;
   a second flow sensor coupled to the flow path of the second paint component, said sensor having means for generating a signal representative of the rate of flow of said second paint component;

an adjustable flow restricting valve in the flow path of the first paint component;

subtracting means for generating an output signal representative of the difference between two input signals, and having two input terminals for receiving said two input signals;

means for connecting the subtracting means output signal to said adjustable flow restricting valve in valve adjusting sense whereby a valve adjusting drive is created proportional to said output signal;

signal transformation means, coupled between said first flow sensor means for generating a signal and said subtracting means first input signal terminal, for selectively transforming the magnitude of said signal representative of the rate of flow of said first paint component;

means for manually setting the selective signal transformation level of said signal transformation means;

means for coupling said second flow sensor signal representative of the rate of flow of said second paint component to said subtracting means second input signal terminal;

means for sensing the initial flow to said spray gun and for generating a blocking signal for a predetermined time after said initial flow is sensed;

means for generating a predetermined initial position signal for said adjustable flow restricting valve; and switch means, connecting said predetermined initial position signal to said adjustable flow restricting valve and disconnecting said subtracting means output signal, said switch means being actuated by said blocking signal.

2. The apparatus of claim 1, further comprising a source of pressurized air, and means for connecting said pressurized air source to said spray gun for atomizing said paint components upon actuation of said spray gun.

3. The apparatus of claim 2, further comprising means for mixing connected to said first and second paint component flow paths, and connected to said spray gun.

4. The apparatus of claim 3, wherein said means for sensing the initial flow to said spray gun further comprises a pressure switch coupled to said pressurized air means for connecting to said spray gun.

5. The apparatus of claim 4 wherein said means for sensing the initial flow further comprises a bleed valve connected to said pressure switch.

6. The apparatus of claim 5, wherein said adjustable flow restricting valve further comprises an air pressure-responsive valve member, and means for coupling said valve member to said source of pressurized air and to said means for connecting the subtracting means output signal.

7. The apparatus of claim 6, further comprising signal transformation means connected between said valve member and said subtracting means output signal, for amplifying and transforming said subtracting means output signal.

8. An apparatus for regulating the flow ratio of two fluid components in a fluid delivery system to conform to a preset ratio, and having a startup transient flow override control mechanism, comprising:

means for storing a signal representative of a manually preset ratio;

means for monitoring the flow of each of said two fluid components;

adjustable valve means for regulating the flow of one of said two fluid components;

scaling means, connected to one of said means for monitoring the flow, for scaling the monitored flow of said component;

comparing means, connected to said scaling means and said preset ratio storing means, for generating a positional error signal when said actual monitored flow ratio is unequal to the product of said preset flow ratio and sealed monitored flow;

valve drive means, connected to said comparing means and said adjustable valve means, for adjusting said valve position in response to said comparing means positional error signal;

means for sensing flow startup of said two fluid components and for generating a predetermined time interval blocking signal in response thereto;

a preset positional signal generator; and switch means, connected to said preset positional signal generator and to said comparing means positional error signal, and to said valve drive means, and actuable by said means for sensing flow startup, for disconnecting said comparing means positional error signal and simultaneously connecting said preset signal generator to said valve drive means in response to said blocking signal.

9. The apparatus of claim 8, wherein said scaling and comparing means further comprises a programmable digital computer.

10. The apparatus of claim 9, wherein said means for monitoring the flow further comprises an acoustic pulse transducer axialy aligned with at least a segment of said flow.

11. The apparatus of claim 10, wherein said means for sensing flow startup further comprises a pressure transducer responsive to a flow startup signal and a bleed valve connected to said pressure transducer.

12. The apparatus of claim 11, wherein said valve drive means further comprises an electrical amplifier circuit connected to said comparing means and an electrical-to-pressure converter connected to said amplifier circuit.

13. The apparatus of claim 12, wherein said preset positional signal generator further comprises a variable resistance circuit.

14. An automatic paint spraying apparatus for feeding a predetermined ratio blend of a first paint component and one of a plurality of second paint components to a paint component mixer and spray gun wherein the predetermined ratio blend of each of the first and second paint component combinations is individually selectable, comprising:

flow delivery means for delivering said first paint component to said mixer;

selection means for selecting one of said plurality of second paint components and delivering said selected second paint component to said mixer;

means for connecting said mixer to said spray gun, including trigger means for initiating flow of said mixed components;

a first flow sensor interposed in said flow delivery means for delivering said first paint component, and a second flow sensor interposed in said means for delivering said second paint component to said mixer;

an adjustable flow restricting valve interposed in said flow delivery means for delivering said first paint component;

means for adjusting said flow restricting valve, said means having an input terminal for receiving a valve position signal;
a plurality of predetermined valve position signal circuits connected to said selection means, each circuit associated respectively with one of said plurality of second paint components;
means for storing a plurality of predetermined ratio signals representative of said individually selectable ratio blends;
calculating and comparing means, connected to said first and second flow sensor and said means for storing a plurality of predetermined ratio signals, for calculating actual flow ratio and comparing with a selected one of said predetermined ratios, and for generating a valve position signal in response to any ratio difference so calculated;
timed switch means connected to receive said generated valve position signal and said predetermined valve position signal and actuable by said trigger means to initially provide said predetermined valve position signal at an output terminal and subsequently to provide said generated valve position signal at said output terminal; and
means for connecting said timed switch means output terminal to said input terminal of said means for adjusting said flow restricting valve.

15. The apparatus of claim 14 wherein said selection means further comprises a plurality of valves respectively placed in each of said second paint component flow paths.

16. The apparatus of claim 15 wherein said first and second flow sensors each comprise an acoustic pulse transducer.

17. The apparatus of claim 16 wherein said means for adjusting said flow restricting valve further comprises an electrical amplifier circuit having a signal input terminal and an electrical-to-pressure converter connected between said amplifier and said adjustable flow restricting valve.

18. The apparatus as claimed in claim 17, wherein said plurality of predetermined valve position signal circuits comprise a plurality of variable resistances.

19. The apparatus as claimed in claim 18, wherein said means for storing a plurality of predetermined ratio signals further comprises a plurality of adjustable resistances.

20. The apparatus as claimed in claim 18, wherein said means for storing a plurality of predetermined ratio signals, and said calculating and comparing means, further comprise in combination a programmable digital computer having an electronic storage medium therein.

21. The apparatus as claimed in claim 20, wherein said timed switch means further comprises a transducer activated by said spray gun trigger actuation, and an adjustable timing means connected to said transducer for deactivating said transducer after a predetermined time.

22. A method of proportioning and mixing two paint components to a selected proportion by regulating one fluid component flow rate, under intermittent spraying conditions, comprising the steps of
sensing the flow startup of the paint components and setting the one fluid component flow regulator to a predetermined flow regulating position
measuring the flow rate of both fluid components and calculating the actual fluid component flow proportion
comparing the calculated flow proportion with the selected proportion, and generating a corrective regulator flow regulating position therefrom;
delaying a predetermined time after sensing flow startup and then switching the one fluid component flow regulator to the corrective regulator flow regulating position;
repeating the measuring, comparing, and generating corrective flow position steps for so long as spraying continues.

23. The method of claim 22 wherein the step of sensing the flow startup further comprises monitoring the static fluid pressure and activating a timing apparatus when a drop in static fluid pressure is sensed.

24. The method of claim 23 wherein the step of measuring the flow rate further comprises;
generating an acoustic pulse and transmitting it through the flowing fluid component in a first flow-aligned direction and in a second flow-opposed direction;
measuring the time of travel differential between said first and second directional pulses;
activating a signal proportional to said measured time differential.

25. The method of claim 24 wherein the step of delaying a predetermined time after sensing flow startup further comprises releasing a pressure source through a bleeder valve, monitoring the pressure drop caused by such release, and activating a circuit when the pressure drop reaches a predetermined level.

* * * * *